(12) United States Patent
Laplante et al.

(10) Patent No.: US 7,186,464 B2
(45) Date of Patent: Mar. 6, 2007

(54) COMPATIBLE BLEND SYSTEMS OF OXYGEN BARRIER POLYMERS AND OXYGEN SCAVENGING POLYMERS

(75) Inventors: Raymond Laplante, Houston, TX (US); Hu Yang, San Ramon, CA (US); Ta Yen Ching, Novato, CA (US); Gangfeng Cai, Danville, CA (US)

(73) Assignee: Chevron Phillips Chemical Co. LP, The Woodlands, TX (US)

( * ) Notice: Subject to any disclaimer, the term of this patent is extended or adjusted under 35 U.S.C. 154(b) by 0 days.

(21) Appl. No.: 09/800,418

(22) Filed: Mar. 6, 2001

(65) Prior Publication Data

US 2002/0002238 A1 Jan. 3, 2002

Related U.S. Application Data

(63) Continuation-in-part of application No. 09/666,642, filed on Sep. 21, 2000, which is a continuation-in-part of application No. 09/595,410, filed on Jun. 16, 2000, which is a continuation-in-part of application No. 09/575,094, filed on May 19, 2000, now Pat. No. 6,525,123.

(51) Int. Cl.
*C08L 29/04* (2006.01)

(52) U.S. Cl. ............... 428/474.4; 428/500; 428/689; 524/323; 524/359; 524/398; 524/401; 524/403; 524/413; 524/435

(58) Field of Classification Search ............ 428/474.4, 428/500, 689; 524/323, 398, 401, 403, 413, 524/435, 359
See application file for complete search history.

(56) References Cited

U.S. PATENT DOCUMENTS

| | | | |
|---|---|---|---|
| 3,497,571 A | 2/1970 | Tellier et al. | 260/844 |
| 3,536,687 A | 10/1970 | Nordstrom | 260/89.5 |
| 4,415,710 A | 11/1983 | Barnabeo et al. | 525/370 |
| 4,524,201 A | 6/1985 | Barnabeo et al. | 528/395 |
| 5,021,515 A | 6/1991 | Cochran et al. | 525/371 |
| 5,116,916 A | 5/1992 | Young | 525/350 |
| 5,153,038 A | 10/1992 | Koyama et al. | 428/35.8 |
| 5,211,875 A | 5/1993 | Speer et al. | 252/188.28 |
| 5,274,024 A | 12/1993 | Koyama et al. | 524/440 |
| 5,281,360 A | 1/1994 | Hong et al. | 252/188.28 |
| 5,346,644 A | 9/1994 | Speer et al. | 252/188.28 |
| 5,356,676 A | 10/1994 | von Widdern et al. | 428/34.8 |
| 5,425,896 A | 6/1995 | Speer et al. | 252/188.28 |
| 5,466,756 A | 11/1995 | Roach et al. | 525/330.6 |
| 5,498,364 A | 3/1996 | Speer et al. | 252/188.28 |
| 5,547,765 A | 8/1996 | Degrassi et al. | 428/474.7 |
| 5,627,239 A | 5/1997 | Ching et al. | 525/330.6 |
| 5,641,825 A | 6/1997 | Bacskai et al. | 524/398 |
| 5,656,692 A | 8/1997 | Hayes | 525/63 |
| 5,660,761 A | 8/1997 | Katsumoto et al. | 252/188.28 |
| 5,700,554 A | 12/1997 | Speer et al. | 428/220 |
| 5,707,750 A | 1/1998 | Degrassi et al. | 428/475.8 |
| 5,716,715 A | 2/1998 | Degrassi et al. | 428/475.8 |
| 5,723,567 A | 3/1998 | Hewel et al. | 528/310 |
| 5,736,616 A | 4/1998 | Ching et al. | 525/330.3 |
| 5,759,653 A | 6/1998 | Collette et al. | 428/35.9 |
| 5,763,095 A | 6/1998 | Ramesh et al. | 428/474.4 |
| 5,776,361 A | 7/1998 | Katsumoto et al. | 252/188.28 |
| 5,837,158 A | 11/1998 | Shepodd et al. | 252/181.6 |
| 5,859,145 A | 1/1999 | Ching et al. | 525/330.6 |
| 5,866,649 A | 2/1999 | Hong et al. | 524/538 |
| 6,057,013 A | 5/2000 | Ching et al. | 428/35.7 |
| 6,063,307 A | 5/2000 | Shepodd et al. | 252/181.6 |
| 6,063,417 A | 5/2000 | Paleari et al. | 426/127 |
| 6,083,585 A | 7/2000 | Cahill et al. | 428/35.7 |
| 6,129,960 A | 10/2000 | Kudert et al. | 428/35.7 |
| 6,254,804 B1 | 7/2001 | Matthews et al. | 252/188.28 |
| 6,255,248 B1 | 7/2001 | Bansleben et al. | 502/159 |
| 6,288,161 B1 * | 9/2001 | Kim et al. | |
| 6,455,620 B1 * | 9/2002 | Cyr et al. | 524/376 |
| 6,525,123 B1 | 2/2003 | Yang et al. | 524/398 |
| 6,610,772 B1 * | 8/2003 | Clauberg et al. | 524/445 |

FOREIGN PATENT DOCUMENTS

| | | |
|---|---|---|
| EP | 0 258 506 | 3/1988 |
| EP | 0 525 240 | 2/1993 |
| EP | 0 987 103 | 3/2000 |
| EP | 1 033 080 | 9/2000 |
| JP | 57-185349 | 11/1982 |
| JP | 2255747 A2 | 10/1990 |
| JP | 3188146 A2 | 8/1991 |
| JP | 5077352 A2 | 3/1993 |
| WO | WO89/01012 | 2/1989 |
| WO | WO99/07180 | 3/1995 |
| WO | WO91/18039 | 11/1997 |
| WO | WO99/15433 | 4/1999 |
| WO | WO99/48963 | 9/1999 |

OTHER PUBLICATIONS

Ching et al., "Tasteless Oxygen Scavenging Polymers: A New Platform Technology for Food Packaging Based On Controlled Oxidation," *Oxygen Absorber . . . 2001 and Beyond*, OSP Conference, pp. 1–8 (Chicago, Jun. 19–20, 2000).

Ching et al., "Tasteless Oxygen Scavenging Polymers: A New Platform Technology for Food Packaging Based On Controlled Oxidation," *Oxygen Absorber . . . 2001 and Beyond*, OSP Conference Slides (Chicago, Jun. 19–20, 2000).

\* cited by examiner

*Primary Examiner*—Jeffrey Mullis

(57) ABSTRACT

Herein is disclosed an oxygen barrier composition comprising an oxygen barrier polymer and an oxygen scavenging polymer. The composition can be in the form of a physical blend or a cross-linked blend, and can further comprise a compatibilizer, a transesterification catalyst, or both. Preferably, the oxygen barrier polymer is poly(ethylene/vinyl alcohol) (EVOH), polyethylene terephthalate (PET), or polyamide other than MXD6. Preferably, the oxygen scavenging polymer comprises an ethylenic backbone and a pendant cyclic olefinic group, or the oxygen scavenging polymer is a polyamide derived at least in part from a xylene diamine-based monomer.

The oxygen barrier composition can be formed into an oxygen barrier layer of a packaging article. Such layers and articles, and methods for making same, are also disclosed.

41 Claims, No Drawings

COMPATIBLE BLEND SYSTEMS OF OXYGEN BARRIER POLYMERS AND OXYGEN SCAVENGING POLYMERS

This application is a continuation-in-part of application Ser. No. 09/666,642, filed Sep. 21, 2000, which is a continuation-in-part of application Ser. No. 09/595,410, filed Jun. 16, 2000, which is a continuation-in-part of application Ser. No. 09/575,094, filed May 19, 2000, now U.S. Pat. No 6,525,123.

BACKGROUND OF THE INVENTION

1. Field of the Invention

The present invention relates generally to the field of oxygen barrier polymers. More particularly, it concerns blends of oxygen barrier polymers, such as poly(ethylene/vinyl alcohol) (EVOH), polyvinyldichloride (PVDC), polyethylene terephthalate (PET), or polyamide other than MXD6, with oxygen scavenging polymers, methods of making the blends, packaging articles comprising the blends, and methods of making the packaging articles.

2. Description of Related Art

It is well known that limiting the exposure of oxygen-sensitive products to oxygen maintains and enhances the quality and shelf-life of the product. For instance, by limiting the oxygen exposure of oxygen sensitive food products in a packaging system, the quality of the food product is maintained, and food spoilage is avoided. In addition such packaging also keeps the product in inventory longer, thereby reducing costs incurred from waste and restocking. In the food packaging industry, several means for limiting oxygen exposure have already been developed, including modified atmosphere packaging (MAP), vacuum packaging and oxygen barrier film packaging. In the first two instances, reduced oxygen environments are employed in the packaging, while in the latter instance, oxygen is physically prevented from entering the packaging environment.

Another, more recent, technique for limiting oxygen exposure involves incorporating an oxygen scavenger into the packaging structure. Incorporation of a scavenger in the package has been mainly used to remove headspace oxygen within the package in a short period of time, thus the oxygen scavenging polymer typically is based on the polymer type of high oxygen transmission rate, which ensures that the headspace oxygen in the package quickly reach the oxygen scavenging site and the oxygen level be reduced in a short period of time.

Oxygen barrier polymers, such as poly(ethylene/vinyl alcohol) (EVOH), polyethylene terephthalate (PET), polyvinyldichloride (PVDC), and polyamide, whether cast, blown, or oriented, are widely known for having very strong barrier properties to gases (such as $O_2$ and $CO_2$) and other fluids, and have found wide use in packaging applications where barrier properties are desired. However, it is generally held that their oxygen barrier properties are not as strong as those of traditional packaging materials, such as glass or metals, which latter materials are suitable for packaging applications which require high oxygen barrier properties over a long period of time, such as beer packaging. This requires that the oxygen barrier performance of the existing barrier polymers be significantly improved or their performance approach to those of e.g. glass or metals.

Therefore, it would be desirable to have a packaging article comprising an oxygen barrier polymer and an additional component or components, which packaging article would be better suited for providing a high oxygen barrier over a long period of time than are packaging articles currently known.

Cochran et al., U.S. Pat. No. 5,021,515, discloses a layer of a packaging article comprising 96% polyethylene terephthalate, 4% nylon MXD6, and 200 ppm cobalt.

Paleari et al., U.S. Pat. No. 6,063,417, discloses a packaging film comprising a core layer comprising about 40 wt % to about 85 wt % nylon 6/12, and about 15 wt % to about 60 wt % ethylene/vinyl alcohol copolymer (EVOH).

Koyama et al., U.S. Pat. No. 5,153,038, discloses a packaging article comprising a layer comprising an oxygen scavenger, such as a polyhydric phenol, and a gas barrier resin, such as EVOH or polyamide.

Hong et al., U.S. Pat. No. 5,281,360, discloses a blend of (i) a polymer, such as a formable polyester or polycarbonate; (ii) an oxygen barrier material, such as EVOH, aromatic or aliphatic nylon, or amorphous nylon (including, according to Hong et al., nylon MXD6); and (iii) a transition metal catalyst. If component (ii) is nylon MXD6, it can be present up to about 30 wt % of the blend, with component (i) being, preferably, polyethylene terephthalate (PET).

Collette et al., U.S. Pat. No. 5,759,653, discloses a blend of PET with an oxygen scavenger, such as nylon MXD6. The blend may also further comprise a metal catalyst.

Bacskai et al., U.S. Pat. No. 5,641,825, discloses compositions comprising (i) a polyolefin grafted with an unsaturated carboxylic acid or an unsaturated carboxylic anhydride, (ii) nylon MXD6, and (iii) cobalt as an oxidation catalyst.

SUMMARY OF THE INVENTION

In one set of embodiments, the present invention relates to a composition, comprising a blend of an oxygen barrier polymer, an oxygen scavenging polymer, and an oxidation catalyst. The blend can be miscible or compatible. In one embodiment, the composition can further comprise a compatibilizer. Preferred oxygen barrier polymers include polymers or copolymers of vinyl alcohol (such as ethylene/vinyl alcohol copolymer (EVOH)), polyesters (such as polyethylene terephthalate (PET) or polyethylene napthalate (PEN)), polymers or copolymers of vinylidene dichloride (such as polyvinylidene dichloride (PVDC)), polymers or copolymers of epoxies, polysulfones, polymers or copolymers of acrylonitrile (such as polyacrylonitrile (PAN)), polymers or copolymers of isocyanates, or polyamides other than MXD6 (e.g. nylon 6; nylon 6,6; or nylon 6,12; among others).

One preferred oxygen scavenging polymer of the blend is a polyamide derived, at least in part, from monomers comprising xylene diamine moieties, and the blend further comprises a transition metal oxidation catalyst. More preferably, the polyamide is MXD6 polymer or oligomer, and the transition metal catalyst is a cobalt salt with an organic counterion.

In a related embodiment, the present invention also relates to a packaging article comprising at least one layer comprising the blend of the oxygen barrier polymer and an oxygen scavenging polymer. The packaging article can be a single-layer or a multilayer article, and can be flexible or rigid. A multilayer packaging article can further comprise a structural layer or layers, an oxygen barrier layer or layers not comprising an oxygen scavenging polymer, an oxygen scavenging layer, an oxygen permeable layer or layers, or an adhesive layer or layers, among others.

In yet another embodiment, the present invention relates to a method of making the blend of an oxygen barrier polymer and an oxygen scavenging polymer, comprising providing the oxygen barrier polymer and the oxygen scavenging polymer, and blending the materials. Preferably, the blend comprises an oxidation catalyst, and the providing step further comprises providing the oxidation catalyst. The blending step can further comprise enhancing the miscibility or compatibility to improve the compatibility of the blends by using any suitable compatibilizer. An oxidation catalyst can be introduced at a suitable stage of the blending process and with a suitable form, either as a neat catalyst, a solution, or a masterbatch.

The present invention provides packaging articles that have a high oxygen barrier for a long period of time, by taking advantage of the inherent oxygen barrier property of e.g. EVOH, PET, PVDC, PAN, or polyamide other than MXD6 and the oxygen scavenging activity of the oxygen scavenging polymer. Because of the low accessibility of oxygen to the oxygen scavenging polymer (OSP) on account of the oxygen barrier polymer, only trace oxygen will reach the OSP; therefore, the OSP is typically not consumed quickly and thus has a very long period of useful life. The present invention also provides packaging articles having the advantage of providing a $CO_2$ barrier (useful in retaining the carbonation of packaged soft drinks, beer, and sparkling wines) due to the inherent barrier properties of the barrier resin, as the OSP is only incorporated at a level below which the impact on the physical barrier properties of the oxygen barrier polymer is minimal. Further, a blend of the oxygen barrier polymer and the oxygen scavenging polymer typically has good clarity and is readily processible into a variety of formulations. A further advantage is realized when the oxygen barrier polymer is EVOH and the oxygen scavenging polymer is a polyamide derived at least in part from xylene diamine-based monomers, viz., EVOH and polyamides are very likely to be inherently compatible due to a favorable hydrogen bonding interaction between the hydroxyl groups of EVOH and the amide groups of polyamides, and the further use of a compatibilizer will generally not be required.

DESCRIPTION OF ILLUSTRATIVE EMBODIMENTS

Oxygen Barrier Compositions

In one embodiment, the present invention relates to a composition, comprising a blend of an oxygen barrier polymer and an oxygen scavenging polymer. Such a composition is useful as a component of an oxygen barrier layer of a packaging article. By "oxygen barrier layer" is meant a layer comprising the blend of the oxygen barrier polymer and the oxygen scavenging polymer. Because of the presence of the OSP, the oxygen barrier layer may be referred to as an "active oxygen barrier" layer.

Packaging articles typically come in several forms including a single layer flexible article, a multilayer flexible article, a single layer rigid article, or a multilayer rigid article. Typical rigid or semirigid articles include plastic, paper or cardboard cartons or bottles such as juice containers, soft drink containers, thermoformed trays, or cups, which have wall thicknesses in the range of 100 to 1000 micrometers. Typical flexible articles include those used to package many food items, and will likely have a thickness of 5 to 250 micrometers. The walls of such articles either comprise single or multiple layers of material.

The packaging article comprising the active oxygen barrier composition can be used to package any product for which it is desirable to inhibit oxygen damage during storage, e.g. food, beverage, pharmaceuticals, medical products, cosmetics, corrodible metals, or electronic devices. It is especially useful for packaging products for which it is desirable to maintain a high oxygen barrier for a long period of time, e.g. beer, wine, and other beverages. It is also especially useful for packaging products for which it is desirable to retain carbon dioxide, e.g. beer, sparkling wine, and soft drinks.

The packaging article comprising the active oxygen barrier composition can comprise a single layer comprising the composition, or an oxygen barrier layer and additional layers, such as an oxygen scavenging layer, an oxygen barrier layer not comprising an oxygen scavenging polymer, a food-contact layer, a structural layer, or an adhesive layer, alone or in any combination. Single layered packaging articles can be prepared by solvent casting, injection molding, blow molding, stretch blow molding, or by extrusion, among other techniques. Packaging articles with multiple layers are typically prepared using coextrusion, injection molding, blow molding, stretch blow molding, coating, or lamination, among other techniques.

The packaging article can comprise any active oxygen barrier composition described below.

As stated above, the active oxygen barrier composition comprises a blend of an oxygen barrier polymer and an oxygen scavenging polymer. Preferably, it further comprises an oxidation catalyst. Preferably, the composition, when formed into a film, has an oxygen transmission rate at least 2 times lower than that of the oxygen barrier polymer alone.

The oxygen barrier polymer is any polymer generally viewed as providing a barrier to oxygen passage, e.g. a 1 mil layer consisting essentially of the oxygen barrier polymer has an oxygen transmission rate of less than about 100 $cc/m^2/day$ at room temperature under 1 atm $O_2$ and 0% humidity. Preferably, the oxygen barrier polymer is selected from polymers or copolymers of vinyl alcohol (such as ethylene/vinyl alcohol copolymer (EVOH)), polyesters (such as polyethylene terephthalate (PET) or polyethylene napthalate (PEN)), polymers or copolymers of vinylidene dichloride (such as polyvinylidene dichloride (PVDC)), polymers or copolymers of epoxies, polysulfones, polymers or copolymers of acrylonitrile (such as polyacrylonitrile (PAN)), polymers or copolymers of isocyanates, or polyamides other than MXD6.

In one preferred embodiment, the oxygen barrier polymer is poly(ethylene vinyl alcohol) (EVOH). In still another preferred embodiment, the oxygen barrier polymer is polyacrylonitrile (PAN) or a copolymer comprising acrylonitrile. In a further preferred embodiment, the oxygen barrier polymer is poly(vinylidene dichloride) (PVDC). In yet an additional preferred embodiment, the oxygen barrier polymer is polyethylene terephthalate (PET). In yet a further preferred embodiment, the oxygen barrier polymer is polyethylene napthalate (PEN). In still an additional preferred embodiment, the oxygen barrier polymer is a polyamide other than MXD6. The polyamide can be aliphatic or aromatic. Preferred polyamides include nylon 6; nylon 6,6; amorphous polyamide; and nylon 6,12.

Two or more oxygen barrier polymers can be used. The appropriateness of a particular oxygen barrier polymer may vary depending on the intended use of the polymer, the composition, or a packaging article made therefrom.

The oxygen scavenging polymer can be any organic compound that irreversibly reacts with oxygen. Preferably, the OSP is a thermoplastic that is miscible or compatible with the oxygen barrier polymer. The polymer can be an addition polymer or a condensation polymer. Examples of addition polymers include, but are not limited to, polymer or copolymer containing either a main chain or pendant cyclic olefinic group, preferably a cyclic olefin group having a cyclohexene structure, such as ethylene/methyl acrylate/ cyclohexenylmethyl acrylate terpolymer (EMCM), ethylene/vinyl cyclohexene copolymer (EVCH) or ethylene/ cyclohexenylmethyl acrylate copolymer (ECHA), or cyclohexenylmethyl acrylate homopolymer (CHAA). Examples also include, but are not limited to, polymer or copolymers containing pendant benzylic group, such as ethylene/methyl acrylate/benzylmethyl acrylate terpolymer (EMBZ). Examples also include diene polymers such as polyisoprene, polybutadiene, and copolymers thereof, e.g. styrene-butadiene. Also included are polymeric compounds such as polypentenamer, polyoctenamer, and other polymers prepared by olefin metathesis; diene oligomers such as squalene; and polymers or copolymers derived from dicyclopentadiene, norbomadiene, 5-ethylidene-2-norbomene, or other monomers containing more than one carbon—carbon double bond (conjugated or non-conjugated).

Examples of condensation polymers include, but are not limited to, condensation polymers such as polyester polymers or copolymers containing carbon—carbon double bonds. More preferably, the polyester containing either a main chain or a pendant cyclic olefinic groups and cyclic olefinic group, preferably a cyclohexene moiety.

Preferably, the oxygen scavenging polymer comprises an ethylenic backbone and at least one cyclic olefinic pendant group. More preferably, the cyclic olefinic pendant group is a cycloalkenyl group having the structure I:

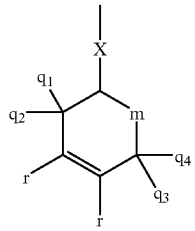

(I)

wherein $q_1$, $q_2$, $q_3$, $q_4$, and r are independently selected from hydrogen, methyl, or ethyl; m is —(CH$_2$)$_n$—, wherein n is an integer from 0 to 4, inclusive; X is null or a linking group; and, when r is hydrogen, at least one of $q_1$, $q_2$, $q_3$, and $q_4$ is also hydrogen. Preferably, in structure I, $q_1$, $q_2$, $q_3$, $q_4$, r, are each hydrogen and m is CH$_2$ (i.e. the cycloalkenyl group is cyclohexenyl).

One most preferred oxygen scavenging compound is ethylene/vinyl cyclohexene copolymer (EVCH).

Preferably, X is a linking group linking the ethylenic backbone to the cyclic olefinic group. The linking group is selected from:

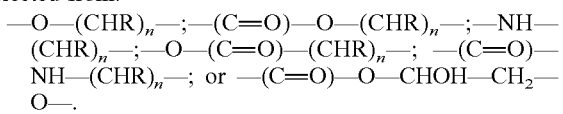

Preferably, the oxygen scavenging polymer is a homopolymer or a copolymer of cyclohexenylmethyl acrylate. A most preferred oxygen scavenging polymer is ethylene/methyl acrylate/cyclohexenylmethyl acrylate terpolymer (EMCM). A further most preferred oxygen scavenging polymer is ethylene/cyclohexenylmethyl acrylate copolymer (ECHA). Yet a further most preferred oxygen scavenging polymer is cyclohexenylmethyl acrylate homopolymer (CHAA).

In another embodiment, the oxygen scavenging polymer is a polyester polymer comprising structure II, or structure III:

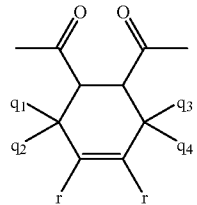

(II)

wherein $q_1$, $q_2$, $q_3$, $q_4$, and r are independently selected from hydrogen, methyl, or ethyl. Preferably, $q_1$, $q_2$, $q_3$, $q_4$, and r are hydrogen (i.e. the polymer is derived from tetrahydrophthalic anhydride).

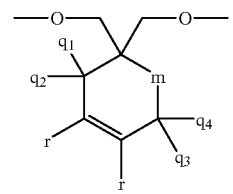

(III)

wherein $q_1$, $q_2$, $q_3$, $q_4$, and r are independently selected from hydrogen, methyl, or ethyl; m is —(CH$_2$)$_n$—, wherein n is an integer from 0 to 4, inclusive; and, when r is hydrogen, at least one of $q_1$, $q_2$, $q_3$, and $q_4$ is also hydrogen. Preferably, the polymer is derived from 3-cyclohexene-1,1 dimethanol.

In still another set of preferred embodiments, the oxygen scavenging polymer is a polyamide derived, at least in part, from monomers comprising a xylene diamine moiety (alternatively, "xylene diamine-based monomers"). By "xylene diamine-based monomer" is meant any substituted or unsubstituted xylene diamine wherein the amine groups are capable of forming polyamide linkages during polymerization with a diacid, diacid halide, etc. The polyamide can be a homopolymer derived from xylene diamine and diacid, or a copolymer comprising any mol % of monomers comprising a xylene diamine moiety; preferably, the polyamide comprises from about 10 mol % to about 50 mol % units derived from a xylene diamine-based monomer.

If the oxygen scavenging polymer is a polyamide derived at least in part from xylene diamine-based monomers, preferably, the oxygen barrier polymer is selected from EVOH, PAN, copolymers comprising acrylonitrile, PVDC, or polyamides not derived from xylene diamine-based monomers.

Two or more oxygen scavenging polymers can be used. It should be noted that the appropriate oxygen scavenging polymer for a given use will depend on the intended use, its processibility with the oxygen barrier polymer, and other parameters.

The blend can comprise from about 0.1% to about 50% of the oxygen scavenging polymer by weight. Preferably, the blend comprises from about 1% to about 30% of the oxygen scavenging polymer by weight. The level of OSP should not significantly plasticize the barrier polymer to cause a significant lowering in passive barrier properties.

The blend makes up at least about 50%, preferably at least about 80%, by weight of the oxygen barrier composition, with the remainder made up of other constituents, as described below.

The blend is preferably in the form of a miscible or compatible blend. Alternatively, the oxygen scavenging polymer can be present in the composition as an insoluble filler (i.e. the oxygen scavenging polymer is cross-linked with itself and is incorporated into the oxygen barrier polymer matrix as a filler).

Typically, the blend is a miscible blend, or is made up with the oxygen barrier polymer as a matrix or dispersing phase, with the oxygen scavenging polymer as the dispersed phase.

From both performance and processing point of view, it is typically desirable that the oxygen scavenging polymer be efficiently dispersed in the barrier polymers. Therefore, a compatibilizer may be needed to improve the miscibility or compatibility of the blend.

Preferred compatibilizers include an anhydride-modified or acid-modified poly(ethylene acrylate), poly(ethylene vinyl acetate), or polyethylene. Another preferred compatibilizer is a block copolymer of the oxygen barrier polymer or a polymer similar thereto (such as EVOH, PET, PVDC, polyethylene napthalate (PEN), or polyamide other than MXD6, among others) and EMCM, ECHA, EVCH, CHAA, or a polymer similar thereto (such as another polymer with an ethylenic backbone and a cycloalkenyl side chain).

In the compatibilizer, the blocks of the oxygen barrier polymer or a polymer similar thereto can be linked to the blocks of EMCM, ECHA, EVCH, CHAA, or a polymer similar thereto by any appropriate linkage, such as ester, carbonate, amide, ether, urethane, or urea linkages. The linkages can be readily formed by attaching components of the linkage to the ends of the two different types of blocks, or by forming the linkage from components thereof already present at the ends of the two different types of blocks, such as hydroxy and ester components of an ester linkage such as is used in polyester synthesis. The latter technique can be used with monomers of the oxygen barrier polymer or polymer similar thereto and the EMCM, ECHA, EVCH, CHAA, or polymer similar thereto, or with blocks of the two types of monomers. Alternatively, the linkages can be formed by making monomers or blocks of EMCM, ECHA, EVCH, CHAA, or a polymer similar thereto with reactive end groups, such as hydroxy, ester, or acid end groups, and then blending it with the oxygen barrier polymer or polymer similar thereto to form block polymers in situ during blending.

More preferably, the compatibilizer is a block copolymer of one of EVOH, PET, PVDC, PEN, or polyamide other than MXD6 with one of EMCM, ECHA, EVCH, or CHAA.

Acrylic acid-containing compatibilizers can also be used.

Preferably, the compatibilizer is present in the blend at no more than about 50% by weight, preferably in the range of about 1 wt % to about 20 wt %.

Alternatively, the oxygen scavenging polymer can be rendered insoluble (meaning "internally cross-linked") by any appropriate mechanism, e.g. by reacting the oxygen scavenging polymer with a chemical crosslinker or by polymerizing the oxygen scavenging polymer with itself to form a cross-linked structure. The insoluble oxygen scavenging polymer can then be mixed into the oxygen barrier polymer phase as a filler.

If the oxygen scavenging polymer is a polyamide derived at least in part from a xylene diamine-based polymer, a compatibilizer is typically not necessary, because polyamides are generally miscible with oxygen barrier polymers. However, one of ordinary skill in the art may wish to include a compatibilizer, in view of the polyamide used, the oxygen barrier polymer used, and other parameters that will be apparent.

Other compounds are commonly used with oxygen scavenging polymers, in order to enhance the functionality of the oxygen scavenging polymers in storage, processing into a layer of a packaging article, or use of the packaging article. Such enhancements include, but are not limited to, limiting the rate of oxygen scavenging by the oxygen scavenging polymer prior to filling of the packaging article with a product, initiating oxygen scavenging by the oxygen scavenging polymer at a desired time, limiting the induction period (the period between initiating oxygen scavenging and scavenging of oxygen at a desired rate), or rendering the layer comprising the oxygen scavenging polymer stronger or more transparent, among others. These compounds can be added to the active oxygen barrier composition comprising the blend of the oxygen barrier polymer and the oxygen scavenging polymer, in order to enhance the functionality of the oxygen scavenging polymer in the composition.

The composition further comprises an oxidation catalyst, such as a transition metal. The transition metal functions to catalyze oxygen scavenging by the oxygen scavenging polymer, increasing the rate of scavenging and reducing the induction period. Though not to be bound by theory, useful transition metals include those which can readily interconvert between at least two oxidation states. See Sheldon, R. A.; Kochi, J. K.; "Metal-Catalyzed Oxidations of Organic Compounds" Academic Press, New York 1981.

Preferably, the transition metal is in the form of a salt, with the transition metal selected from the first, second or third transition series of the Periodic Table. Suitable metals include, but are not limited to, manganese, iron, cobalt, nickel, copper, rhodium, and ruthenium. The oxidation state of the metal when introduced need not necessarily be that of the active form. The metal is preferably iron, nickel, manganese, cobalt or copper; more preferably manganese or cobalt; and most preferably cobalt. Suitable counterions for the metal include, but are not limited to, chloride, acetate, oleate, stearate, palmitate, 2-ethylhexanoate, neodecanoate, or naphthenate; preferably, the counterion is selected from $C_1$–$C_{20}$ alkanoates. Preferably, the salt, the transition metal, and the counterion are either on the U.S. Food and Drug Administration GRAS (generally regarded as safe) list, or exhibit substantially no migration from the packaging article to the product (i.e. less than about 500 ppb, preferably less than about 50 ppb, in the product). Particularly preferable salts include cobalt oleate, cobalt stearate, cobalt 2-ethylhexanoate, and cobalt neodecanoate. The metal salt may also be an ionomer, in which case a polymeric counterion is employed. Such ionomers are well known in the art.

Typically, the amount of transition metal may range from 0.001 to 1% (10 to 10,000 ppm) of the composition, based on the metal content only (excluding ligands, counterions, etc.). In a packaging article, the transition metal can be formed in an oxygen barrier layer comprising the oxygen barrier composition of the invention, or in a layer adjacent to the oxygen barrier layer.

Another compound that can be added to the composition is a photoinitiator, or a blend of different photoinitiators. A photoinitiator is preferred if antioxidants are included in the composition to prevent premature oxidation of the oxygen scavenging polymer.

Suitable photoinitiators are well known to those skilled in the art. Specific examples include, but are not limited to, benzophenone, o-methoxybenzophenone, acetophenone, o-methoxy-acetophenone, acenaphthenequinone, methyl ethyl ketone, valerophenone, hexanophenone, α-phenyl-butyrophenone, p-morpholinopropiophenone, dibenzosuberone, 4-morpholinobenzophenone, benzoin, benzoin methyl ether, 4-o-morpholinodeoxybenzoin, p-diacetylbenzene, 4-aminobenzophenone, 4'-methoxyacetophenone, a-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de] anthracen-7-one, benzoin tetrahydropyranyl ether, 4,4'-bis (dimethylamino)-benzophenone, 1'-acetonaphthone, 2'-acetonaphthone, acetonaphthone and 2,3-butanedione, benz[a]anthracene-7,12-dione, 2,2-dimethoxy-2-phenylacetophenone, α,α-diethoxyacetophenone, and α,α-dibutoxyacetophenone, among others. Singlet oxygen generating photosensitizers such as Rose Bengal, methylene blue, and tetraphenyl porphine may also be employed as photoinitiators. Polymeric initiators include poly(ethylene carbon monoxide) and oligo[2-hydroxy-2-methyl-1-[4-(1-methylvinyl)phenyl]propanone].

Use of a photoinitiator is preferable because it generally provides faster and more efficient initiation of oxygen scavenging by the oxygen scavenging polymer. However, due to the high cost of photoinitiators, it is desirable to use the minimum amount of photoinitiator required to initiate oxygen scavenging. This minimum amount will vary depending on the photoinitiator used, the wavelength and intensity of ultraviolet light used to initiate, and other factors. Preferably, the photoinitiator is either on the U.S. Food and Drug Administration GRAS (generally regarded as safe) list, or exhibits substantially no migration from the packaging article to the product (i.e. less than 50 ppb in the product).

Photoinitiators that are especially useful in the present invention include benzophenone derivatives containing at least two benzophenone moieties, as described in Katsumoto et al., U.S. Pat. 6,139,770. These compounds act as effective photoinitiators to initiate oxygen scavenging activity in the oxygen barrier composition of the present invention. Such benzophenone derivatives have a very low degree of extraction from oxygen scavenging compositions, which may lead to reduced malodor or off-taste of a packaged food, beverage, or oral pharmaceutical product by extracted photoinitiator.

A "benzophenone moiety" is a substituted or unsubstituted benzophenone group. Suitable substituents include alkyl, aryl, alkoxy, phenoxy, and alicyclic groups contain from 1 to 24 carbon atoms or halides.

The benzophenone derivatives include dimers, trimers, tetramers, and oligomers of benzophenones and substituted benzophenones.

The benzophenone photoinitiators are represented by the formula:

wherein A is a bridging group selected from sulfur; oxygen; carbonyl; —SiR″$_2$—, wherein each R″ is individually selected from alkyl groups containing from 1 to 12 carbon atoms, aryl groups containing 6 to 12 carbon atoms, or alkoxy groups containing from 1 to 12 carbon atoms; —NR‴—, wherein R‴ is an alkyl group containing 1 to 12 carbon atoms, an aryl group containing 6 to 12 carbon atoms, or hydrogen; or an organic group containing from 1 to 50 carbon atoms; a is an integer from 0 to 11; B is a substituted or unsubstituted benzophenone group; and b is an integer from 2 to 12.

The bridging group A can be a divalent group, or a polyvalent group with 3 or more benzophenone moieties. The organic group, when present, can be linear, branched, cyclic (including fused or separate cyclic groups), or an arylene group (which can be a fused or non-fused polyaryl group). The organic group can contain one or more heteroatoms, such as oxygen, nitrogen, phosphorous, silicon, or sulfur, or combinations thereof. Oxygen can be present as, for example, an ether, ketone, aldehyde, ester, or alcohol.

The substituents of B, herein R″, when present, are individually selected from alkyl, aryl, alkoxy, phenoxy, or alicyclic groups containing from 1 to 24 carbon atoms, or halides. Each benzophenone moiety can have from 0 to 9 substituents. Substituents can be selected to render the photoinitiator more compatible with the oxygen barrier composition.

Examples of such benzophenone derivatives comprising two or more benzophenone moieties include dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer (a mixture of compounds containing from 2 to 12 repeating styrenic groups, comprising dibenzoylated 1,1-diphenyl ethane, dibenzoylated 1,3-diphenyl propane, dibenzoylated 1-phenyl naphthalene, dibenzoylated styrene dimer, dibenzoylated styrene trimer, and tribenzoylated styrene trimer), and substituted benzoylated styrene oligomer. Tribenzoyl triphenylbenzene and substituted tribenzoyl triphenylbenzene are especially preferred.

When a photoinitiator is used, its primary function is to enhance and facilitate the initiation of oxygen scavenging by an active oxygen barrier layer comprising the oxygen scavenging polymer upon exposure to radiation. The amount of photoinitiator can vary. In many instances, the amount will depend on the blend ratio or the particular oxygen scavenging polymer used, the wavelength and intensity of UV radiation used, the nature and amount of antioxidants used, as well as the type of photoinitiator used. The amount of photoinitiator also depends on the intended use of the composition. For instance, if the photoinitiator-containing component is placed underneath a layer which is somewhat opaque to the radiation used, more initiator may be needed. For most purposes, however, the amount of photoinitiator, when used, will be in the range of 0.01 to 10% by weight of the oxygen barrier composition.

Antioxidants can be used in the composition to control scavenging initiation. An antioxidant as defined herein is a material which inhibits oxidative degradation or cross-linking of polymers. Typically, antioxidants are added to facilitate the processing of polymeric materials or prolong their useful lifetime. In relation to this invention, such additives prolong the induction period for oxygen scavenging in the absence of irradiation. When it is desired to commence oxygen scavenging by the oxygen scavenging polymer of the active oxygen barrier layer of the packaging article, the packaging article (and any incorporated photoinitiator) can be exposed to radiation.

Antioxidants such as 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, and dilaurylthiodipropionate are suitable for use with this invention.

The amount of an antioxidant which may be present may also have an effect on oxygen scavenging. As mentioned earlier, such materials are usually present in oxidizable organic compounds or structural polymers to prevent oxidation or gelation of the polymers. Typically, they are present in about 0.01 to 1% by weight of the composition. However, additional amounts of antioxidant may also be added if it is desired to tailor the induction period as described above.

Other additives which can be included in the active oxygen barrier layer include, but are not necessarily limited to, fillers, pigments, dyestuffs, stabilizers, processing aids, plasticizers, fire retardants, and anti-fog agents, among others.

Any other additives employed normally will not comprise more than 10% of the composition by weight, with preferable amounts being less than 5% by weight of the composition.

The active oxygen barrier composition can be stored after being made, or can be made as part of a process of forming a packaging article, as will be described below.

In addition to the active oxygen barrier layer, if the packaging article is a multilayer article, it can comprise other layers useful in a flexible or rigid multilayer packaging article.

As stated above, if a transition metal salt is included in the packaging article to increase the rate of oxygen scavenging or reduce the induction time, the transition metal can be included either in the active oxygen barrier layer or in a layer adjacent to the active oxygen barrier layer. Any transition metal salt described above can be formed in the adjacent layer.

The active oxygen barrier layer can also comprise a photoinitiator, an antioxidant, or both, as described above. Other additives can also be included as desired.

A multilayer packaging article of the present invention can also comprise at least one structural layer located to the interior, the exterior, or both of the active oxygen barrier layer. The structural layer or layers comprise a structural polymer that imparts useful structural properties, such as rigidity, flexibility, or strength, among others, to the packaging article. Suitable structural polymers include, but are not limited to, polyethylene, low density polyethylene, very low density polyethylene, ultra-low density polyethylene, high density polyethylene, polyvinyl chloride, ethylene-vinyl acetate, ethylene-alkyl (meth)acrylates, ethylene-(meth)acrylic acid, PET, polyamides, polypropylene, or ethylene-(meth)acrylic acid ionomers. Blends of different structural polymers may also be used. However, the selection of the structural polymer largely depends on the article to be manufactured and the end use thereof. Such selection factors are well known in the art.

Preferably, the structural polymer is selected from PET, polyamides, polypropylene, polyethylene, low density polyethylene, very low density polyethylene, ultra-low density polyethylene, high density polyethylene, polyvinyl chloride, ethylene-vinyl acetate, ethylene-alkyl (meth)acrylates, ethylene-(meth)acrylic acid, or ethylene-(meth)acrylic acid ionomers.

If the packaging article is a rigid carton, such as a juice carton, the structural layer can comprise paperboard or cardboard.

Also, a multilayer packaging article may comprise an oxygen scavenging layer, comprising an oxygen scavenging polymer and, optionally, other additives, such as a photoinitiator, a transition metal catalyst, an antioxidant, a structural polymer, or others, alone or in any combination, as described above. The oxygen scavenging layer can be an integral part of the packaging article, or it can be a liner, coating, sealant, gasket, adhesive, non-adhesive insert, or fibrous mat insert in the packaging article.

Additionally, a multilayer packaging article according to the present invention may further comprise at least one oxygen barrier layer, i.e. a layer having an oxygen transmission rate equal to or less than 100 cubic centimeters per square meter (cc/m$^2$) per day per atmosphere at room temperature (about 25° C.) and 0% humidity, wherein the layer does not comprise an oxygen scavenging polymer. Typical oxygen barrier layers comprise poly(ethylene/vinyl alcohol) (EVOH), polyacrylonitrile, a copolymer comprising acrylonitrile, poly(vinylidene dichloride), polyethylene terephthalate (PET), silica, polyamide other than MXD6, or mixtures thereof. However, because the blend of the oxygen barrier polymer and the oxygen scavenging polymer inhibits oxygen transmission to a high degree, the need for a separate oxygen barrier layer is reduced and may, depending on the form of the packaging article and the intended use, be dispensed with entirely, if desired.

Other additional layers of a multilayer packaging article may include one or more layers which are permeable to oxygen. In one packaging article, preferred for flexible packaging of food and scavenging of oxygen found in the packaged food, the layers include, in order starting from the outside of the package to the innermost layer of the package, (i) an oxygen barrier layer, (ii) an optional oxygen scavenging layer, and (iii) an optional oxygen-permeable layer. Control of the oxygen barrier property of (i) limits the rate of oxygen entry to the oxygen scavenging moieties in layer (ii), and thus slows the consumption of oxygen scavenging capacity by atmospheric oxygen. Control of the oxygen permeability of layer (iii) impacts the rate of oxygen scavenging for the overall structure. Furthermore, layer (iii) can provide a barrier to migration of the components of the outer layers, or by-products of the reaction of such components with oxygen or other reactants, into the package interior. Even further, layer (iii) can improve the heat-sealability, clarity, or resistance to blocking of the multilayer packaging article.

Further additional layers, such as adhesive layers, may also be used in the multilayer packaging article. Compositions typically used for adhesive layers include anhydride functional polyolefins and other well-known adhesive layers.

In another embodiment, the present invention relates to a method of making an active oxygen barrier composition comprising an oxygen barrier polymer and an oxygen scavenging polymer, comprising blending the oxygen barrier polymer and the oxygen scavenging polymer.

The oxygen barrier polymer and the oxygen scavenging polymer are as described above. Typically, the oxygen barrier polymer and the oxygen scavenging polymer are provided as a solid formulation, such as pellets or a powder.

The blend can be prepared by mixing the oxygen barrier polymer and the oxygen scavenging polymer in any appropriate apparatus. Typically, the oxygen barrier polymer and the oxygen scavenging polymer are mixed together, heated to melting and stirred to homogeneity, and the homogenous melt is then extruded. The extruded melt is then typically cooled and pelletized to form pellets of the blend. However, other forms of the blend, such as a powder, are possible. Other techniques of preparing the blend may be apparent to one of ordinary skill in the art.

To aid mixing of the oxygen barrier polymer and the oxygen scavenging polymer, the blending step can further comprise blending a compatibilizer with the oxygen barrier polymer and the oxygen scavenging polymer. The compatibilizer is as described above. The blending can also integrated directed into the manufacturing process or forming step of the final packaging article as the feed material.

Alternatively, if the oxygen scavenging polymer is desired as a filler in the oxygen barrier polymer phase, then the composition can be prepared by, first, internally cross-linking the oxygen scavenging polymer, such as by chemical cross-linking or polymerization, and second, mixing the insoluble oxygen scavenging polymer with the oxygen barrier polymer.

The blend can also comprise other constituents, such as a transition metal oxidation catalyst, a photoinitiator, an antioxidant, or any combination thereof, among others, as described above. The constituents can generally be added to the blending step. If the OSP is provided as a filler, the constituents are typically blended with the oxygen barrier polymer phase. The oxidation catalyst can be introduced at any stage of the process, either at the mixing stage or at the fabrication stage of the final article, see below.

After being made, the blend can be stored for at least several days, and preferably indefinitely, or it can be made as part of a method of forming an oxygen barrier layer in a packaging article, as described below. In such a method, the blended composition is fed from the extruder or other blending apparatus directly into further steps of the method.

In another embodiment, the present invention relates to a method of forming an active oxygen barrier layer in a packaging article, comprising: (i) providing an oxygen barrier composition comprising an oxygen barrier polymer and an oxygen scavenging polymer; and (ii) forming the composition into the packaging article or the oxygen barrier layer thereof.

The packaging article can be flexible or rigid, single-layer or multilayer, as described above. The oxygen barrier polymer and the oxygen scavenging polymer are also as described above. Preferably, the oxygen scavenging polymer comprises an ethylenic backbone and a cycloalkenyl group having structure I:

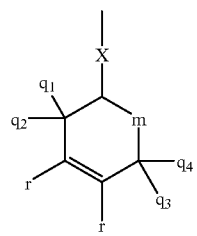

(I)

wherein $q_1$, $q_2$, $q_3$, $q_4$, and r are independently selected from hydrogen, methyl, or ethyl; m is $-(CH_2)_n-$, wherein n is an integer from 0 to 4, inclusive; X is null or a linking group; and, when r is hydrogen, at least one of $q_1$, $q_2$, $q_3$, and $q_4$ is also hydrogen. Preferably, in structure I, $q_1$, $q_2$, $q_3$, $q_4$, r, are each hydrogen and n is 1 (i.e. the cycloalkenyl group is cyclohexenyl).

One most preferred oxygen scavenging compound is ethylene/vinyl cyclohexene copolymer (EVCH).

Preferably, X is a linking group linking the ethylenic backbone to the cyclic olefinic group. The linking group is selected from:

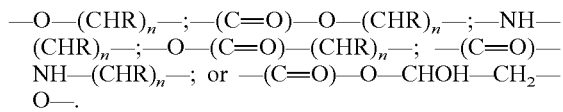

Preferably, the oxygen scavenging polymer is a homopolymer or a copolymer of cyclohexenylmethyl acrylate. A most preferred oxygen scavenging polymer is ethylene/methyl acrylate/cyclohexenylmethyl acrylate terpolymer (EMCM). A further most preferred oxygen scavenging polymer is ethylene/cyclohexenylmethyl acrylate copolymer (ECHA). Yet a further most preferred oxygen scavenging polymer is cyclohexenylmethyl acrylate homopolymer (CHAA).

In another embodiment, the oxygen scavenging polymer is a polyester polymer comprising structure II or structure III:

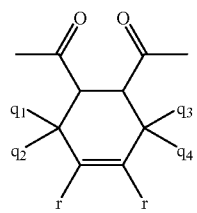

(II)

wherein $q_1$, $q_2$, $q_3$, $q_4$, and r are independently selected from hydrogen, methyl, or ethyl. Preferably, $q_1$, $q_2$, $q_3$, $q_4$, and r are hydrogen (i.e. the monomer is tetrahydrophthalic anhydride).

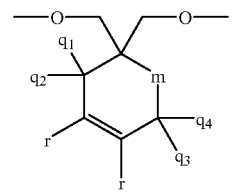

(III)

wherein $q_1$, $q_2$, $q_3$, $q_4$, and r are independently selected from hydrogen, methyl, or ethyl; m is $-(CH_2)_n-$, wherein n is an integer from 0 to 4, inclusive; and, when r is hydrogen, at least one of $q_1$, $q_2$, $q_3$, and $q_4$ is also hydrogen. Preferably, the monomer is 3-cyclohexene-1,1 dimethanol (i.e. $q_1$, $q_2$, $q_3$, $q_4$, and r are hydrogen and n is 1).

Still another preferred oxygen scavenging polymer is EMBZ, as discussed above.

In an alternative embodiment, preferably the oxygen scavenging polymer is a polyamide derived, at least in part, from xylene diamine-based monomers.

The packaging article may comprise one or more oxygen barrier layers comprising the composition of the present invention.

The forming step can be by any technique appropriate depending on the oxygen barrier composition, the packaging article, and other parameters. As mentioned above, single layered packaging articles typically can be prepared by solvent casting, injection molding, blow molding, injection blow molding, or extrusion, among others. Packaging articles with multiple layers are typically prepared using coextrusion, injection molding, blow molding, injection blow molding, coating, or lamination, among others.

If a transition metal catalyst is desired for inclusion in the packaging article, to catalyze oxygen scavenging by the composition, the forming step comprises forming a transition metal catalyst into the oxygen barrier layer or a layer adjacent to the oxygen barrier layer of the packaging article.

The active oxygen barrier composition can also comprise a photoinitiator, an antioxidant, a structural polymer, or other additives as described above.

In addition to the active oxygen barrier layer, the packaging article to be formed can comprise other layers, such as an oxygen barrier layer not comprising an oxygen scavenging polymer, a structural layer, an oxygen scavenging layer, or a seal layer or food contact layer forming the interior surface of the packaging article, among others. Depending on the desired form of the packaging article, the forming step can comprise forming the packaging article as a single layer flexible article, a multilayer flexible article, a single layer rigid article, or a multilayer rigid article.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Preparation of a Multi-Layer Film with an Oxygen Barrier Core Layer

A series of four dry blend samples were prepared from pellets of ethylene-vinyl alcohol copolymer (EVOH), ethylene/methyl acrylate/cyclohexenylmethyl acrylate terpolymer (EMCM), and an ethylene/methyl acrylate copolymer-(EMAC-) based cobalt masterbatch (containing 1 wt % tribenzoyl triphenylbenzene ($BBP^3$) and 1 wt % cobalt as cobalt oleate) by mixing in a polyethylene bag. The samples differed in the weight ratio among EVOH, EMCM, and the cobalt masterbatch. A fifth sample consisting of EVOH was prepared as a control. The proportions of the ingredients in the blends are shown in Table 1.

TABLE 1

Blend Composition

| Material | EVOH, % by wt. | EMCM % by wt. | Masterbatch % by wt. |
|---|---|---|---|
| Sample 1 | 95 | 4.5 | 0.5 |
| Sample 2 | 90 | 9 | 1 |
| Sample 3 | 87 | 9 | 4 |
| Sample 4 | 80 | 18 | 2 |
| Sample 5 | 100 | 0 | 0 |

The EVOH (Soarnol A4412 grade, from Nippon Synthetic Chemical Industry Co.) used contained 44 mole % ethylene content and had a melt index of 12 g/10 min at 210° C. and a loading of 2.16 kg, and a melting point of 164° C. The EVOH resin was dried at 90° C. for 3 hours under vacuum to remove residual moisture.

EMCM, the oxygen scavenging polymer used, was as discussed in the previous section, and was obtained from Chevron Chemical Co.

The EMAC-based cobalt masterbatch (containing 1 wt % $BBP^3$ and 1 wt % cobalt as cobalt oleate) was obtained from Chevron Chemical Co.

The above four dry blends and the control (Samples 1–5) were melt blended on a Hakke twin screw extruder at temperature range of 190° C. to 220° C. at 30 rpm screw speed. A three layer film was cast from each composition from a Randcastle coextrusion machine, with the oxygen barrier blend composition or control as core layer and commercial polyethylene as interior and exterior skin layers. The dimension of the three layer films was controlled at 0.5 mil/1.0 mil/0.5 mil. The temperature settings for film casting were in the range of 430° F. and screw speeds were in the range of 15 rpm to 30 rpm. The material of each individual layer was fed into one of the two extruders of the Randcastle machine. While in the die, the layers were juxtaposed and combined, then emerged from the die as a three-layer film. After exiting the die, the film was oriented monoaxially: the extrudate was cast onto a first controlled temperature casting roll with stretching in the machine direction and the film was then collected at the second roll. All the films made were transparent with light color.

EXAMPLE 2

Oxygen Transmission Test on Mocon

The films prepared in Example 1 were tested for oxygen permeability using a Mocon Ox-Trans 2/20 ML system at 23° C. Nitrogen containing 2% hydrogen was used as carrier gas to flush both sides of the film at 10 cc/min flow rate for 1–4 hrs before testing. Air was used as test gas at 10 cc/min flow rate. The oxygen permeability was measured in cubic centimeters per square meter per 24 hours. The film size for the test was 50 $cm^2$. Oxygen scavenging by EMCM in the oxygen barrier layer was triggered by exposing the film to UV light at 254 nm.

TABLE 2

Oxygen Permeability

| Material | EVOH, % by wt. | EMCM % by wt. | Masterbatch % by wt. | Oxygen Permeability $cc/m^2 \cdot day$ |
|---|---|---|---|---|
| Sample 1 | 95 | 4.5 | 0.5 | — |
| Sample 2 | 90 | 9 | 1 | 4.16 |
| Sample 3 | 87 | 9 | 4 | 0.62 |
| Sample 4 | 80 | 18 | 2 | 0.0 |
| Sample 5 | 100 | 0 | 0 | 4.64 |

From the above table, it is apparent that the presence of the oxygen scavenging polymer EMCM in the EVOH matrix (i.e. having an active oxygen barrier) can significantly lower the oxygen permeability of a film, relative to films comprising oxygen barrier layers not comprising an oxygen scavenging polymer as are known in the art. At 9 wt % loading of EMCM (sample 3), the oxygen permeability was lowered about 7-fold with the presence of sufficient cobalt masterbatch. At 18 wt % loading of EMCM, the oxygen permeability was lowered to substantially zero.

EXAMPLE 3

Preparation of a Multi-Layer Film with an Oxygen Barrier Core Layer

A series of three dry blend samples were prepared from pellets of ethylene-vinyl alcohol copolymer (EVOH, Eval F101A, containing 68% mole vinyl alcohol, from Evalca Co.), MXD6 Nylon (MX Nylon 6007 from Mitsubishi Gas Chemical Co.) and an ethylene/methyl acrylate copolymer-(EMAC) based cobalt masterbatch (containing 1 wt % cobalt as cobalt oleate), by mixing in a polyethylene bag. The samples differed in the weight ratio among EVOH, MXD6, and the cobalt catalyst masterbatch. The proportions of the ingredients in the blends, as well as the core layer composition of 3-layer films, are shown in Table 3.

TABLE 3

Blend Composition of Core Layer in 3-Layered Films:

| Material | EVOH, % wt. | MXD6, % wt. | Co Masterbatch % wt. |
|---|---|---|---|
| Sample 1 | 100 | 0 | 0 |
| Sample 2 | 95 | 5 | 0 |
| Sample 3 | 94 | 5 | 1 |

The two formulations (sample 2–3) were melt blended on an Haake twin screw extruder at temperature 260° C. at 20 rpm screw speed. The 3-layer film samples were then cast on a Randcastle coextrusion machine, with each of the above formulations (sample 1–3) as core layer and polyethylene resin (Chevron PE 4517) as skin layer. The layer structure was as PE/sample/PE (1.0/1.0/1.0 mil). On the Randcastle machine, the temperature settings were 460° F., 510° F. and 520° F. for zones 1–3, respectively. The screw speed was set at 40 rpm. The temperature was set at 510° F. for the feed block and 500° F. for the die. After exiting the die, the film was oriented monoaxially: the extrudate was cast onto a first controlled temperature casting roll with stretching in the machine direction and the film was then collected at the second roll. All the films made were transparent, an indication of sufficient compatibility of the blends.

EXAMPLE 4

Oxygen Transmission Test on Mocon Oxtran

The films prepared in Example 3 were tested for oxygen permeability using a Mocon Ox-Trans 2/20 system at 23° C. under dry conditions. Nitrogen containing 2% hydrogen was used as carrier gas to flush both sides of the film at 10 cc/min flow rate for 1–4 hrs before testing. Air was used as test gas at 10 cc/min flow rate. The oxygen permeability was measured in cubic centimeters per square meter per 24 hours. The film size for the test is 50 cm$^2$.

TABLE 4

Oxygen Transmission Rate vs. Core Layer Comppostion of 3-Layer Films:

| Core Layer Composition | EVOH, % wt. | MXD6, % wt. | Co Masterbatch % wt. | OTR, cc/ mil.M$^2$·Day |
|---|---|---|---|---|
| Sample 1 | 100 | 0 | 0 | 0.54 |
| Sample 2 | 95 | 5 | 0 | 0.46 |
| Sample 3 | 94 | 5 | 1 | 0 |

From the above table, it is apparent that the presence of the oxygen scavenging polymer MXD6, along with small amount of cobalt catalyst, in the EVOH matrix can significantly lower the oxygen permeability of a film, relative to films comprising oxygen barrier layers not comprising an oxygen scavenging polymer as are known in the art. At 5 wt % loading of MXD6 (sample 3), the oxygen permeability was reduced below the detection limit with the presence of a very small amount of cobalt masterbatch.

All of the compositions and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and methods and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. An oxygen battier composition, comprising:
   a blend of an oxygen barrier polyme and an oxygen scavenging polymer,
   a photoinitiator, and
   an oxidation catalyst,
   wherein the blend comprises from 5% to 30% oxygen scavenging polymer, the oxygen barrier polymer is poly (ethylene/vinyl alcohol) (EVOH), and the oxygen scavenging polymer consists essentially of MXD6.

2. The composition of claim 1, wherein the composition has an oxygen transmission rate at least 2 times lower than that of poly(ethylene/vinyl alcohol) (EVOH) alone.

3. The composition of claim 1, wherein the oxidation catalyst comprises a transition metal selected from cobalt, copper, nickel, iron, manganese, rhodium, or ruthenium.

4. The composition of claim 3, wherein the oxidation catalyst is a salt comprising a counterion selected from $C_1$–$C_{20}$ alkanoates.

5. The composition of claim 4, wherein the transition metal salt is cobalt oleate, cobalt stearate, or cobalt neodecanoate.

6. The composition of claim 1, wherein the photoinitiator is selected from benzophenone derivatives containing at least two benzophenone moieties and having the formula:

wherein
A is a bridging group selected from sulfur; oxygen; carbonyl; —SIR"$_2$—, wherein each R" is individually selected from alkyl groups containing from 1 to 12 carbon atoms, aryl groups containing 6 to 12 carbon atoms, or alkoxy groups containing from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;
a is an integer from 0 to 11;
B is a substituted or unsubstituted benzophenone group; and
b is an integer from 2 to 12.

7. The composition of claim 6, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted benzoylated styrene oligomer.

8. The composition of claim 1, further comprising an antioxidant.

9. The composition of claim 8, wherein the antioxidant is selected from 2,6-di(t-butyl)-4-methylphenol(BHT), 2,2'-methylene-bis(6-t-butyl-p-cresol), triphenylphosphite, tris-(nonylphenyl)phosphite, vitamin E, tetra-bismethylene 3-(3, 5-ditertbutyl-4-hydroxyphenyl)-propionate methane, or dilaurylthiodipropionate.

10. A packaging article, comprising:
(a) at least one oxygen barrier layer comprising
a blend of an oxygen barrier polymer and an oxygen scavenging polymer, and
a photoinitiator,
wherein the blend comprises from 5% to 30% oxygen scavenging polymer, the oxygen barrier polymer is poly(ethylene/vinyl alcohol) (EVOH), and the oxygen scavenging polymer consists essentially of MXD6; and
(b) a transition metal salt in the oxygen barrier layer or a layer adjacent to the oxygen barrier layer.

11. The packaging article of claim 10, wherein the transition metal is selected from cobalt, copper, nickel, iron, manganese, rhodium, or ruthenium.

12. The packaging article of claim 11, wherein the transition metal salt comprises a counterion selected tram $C_1$–$C_{20}$ alkanoates.

13. The packaging article of claim 12, wherein the transition metal salt is cobalt oleate, cobalt stearate, or cobalt neodecanoate.

14. The packaging article of claim 10, wherein the photoinitiator is selected from benzophenone derivatives containing at least two benzophenone moieties and having the formula:

$$A_0(B)_b$$

wherein
A is a bridging group selected from sulfur; oxygen; carbonyl; —SiR"2—, wherein each R" is individually selected from alkyl groups containing from 1 to 12 carbon atoms, aryl groups containing 6 to 12 carbon atoms, or alkoxy groups comaining from 1 to 12 carbon atoms; —NR'"—, wherein R'" is an alkyl group containing 1 to 12 carbon atoms, an aryl group containing 6 to 12 carbon atoms, or hydrogen; or an organic group containing from 1 to 50 carbon atoms;
a is an integer from 0 to 11:
B is a substituted or unsubstituted benzophenone group; and
b is an integer from 2 to 12.

15. The packaging article of claim 14, wherein the photoinitiator is selected from dibenzoyl biphenyl, substituted dibenzoyl biphenyl, benzoylated terphenyl, substituted benzoylated terphenyl, tribenzoyl triphenylbenzene, substituted tribenzoyl triphenylbenzene, benzoylated styrene oligomer, or substituted beazoylated styrene oligomer.

16. The packaging article of claim 10, further comprising an antioxidant in the oxygen barrier layer.

17. The packaging article of claim 16, wherein the antioxidant is selected from 2,6-di(t-butyl)-4-methylphenol (BHT), 2,2'-methylene-bis(6-t-butyl-p-cresol), triphenylphosphite, tris-(nonylphenyl)phosphite, vitamin E, tetra-bismethylene 3-(3,5-ditertbutyl-4-hydroxyphenyl)-propionate methane, or dilaurylthiodipropionate.

18. The packaging article of claim 10, further comprising an oxygen barrier layer, wherein the oxygen barrier layer does not comprise a polyamide derived at least in part from a xylylene diamine-based monomer.

19. The packaging article of claim 18, wherein the oxygen barrier layer not comprising a polyamide derived at least in part from a xylylene diamine-based monomer comprises poly(ethylene vinyl alcohol) (EVOH), polyacrylonitrile (PAN), a copolymer comprising acrylonitrile, poly(vinylidene dichloride) (PVDC), polyethylene terephthalate (PET), or polyethylene napthalate (PEN).

20. The packaging article of claim 10, further comprising a structural layer.

21. The packaging article of claim 20, wherein the structural layer comprises PET, polyamide, polypropylene, polyethylene, low density polyethylene, very low density polyethylene, ultra-low density polyethylene, high density polyethylene, polyvinyl chloride, ethylene-vinyl acetate, ethylene-alkyl (meth)acrylates, ethylene-(meth)acrylic acid, ethylene-(meth)acrylic acid ionomers, paperboard, or cardboard.

22. The packaging article of claim 10, further comprising an oxygen scavenging layer.

23. The packaging article of claim 22, wherein the oxygen scavenging layer comprises an oxygen scavenging polymer comprising an ethylenic backbone and a cycloalkenyl group with structure I:

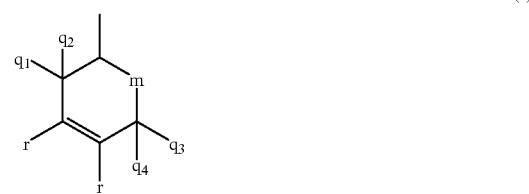

(I)

wherein $q_1$, $q_2$, $q_3$, $q_4$, and r are independently selected from hydrogen, methyl, or ethyl; m is —$(CH_2)_n$—, wherein n is an integer from 0 to 4, inclusive; and, when r is hydrogen, at least one of $q_1$, $q_2$, $q_3$, and $q_4$ is also hydrogen.

24. The packaging article of claim 23, wherein the oxygen scavenging layer comprises an oxygen scavenging polymer selected from ethylene/methyl acrylate/cyclohexenylmethyl acrylate terpolymer (EMCM), ethylene/vinyl cyclohexene copolymer (EVCH), ethylene/cyclohexenylmethyl acrylate copolymer (ECHA), or cyclohexenylmethyl acrylate homopolymer (CHAA).

25. The packaging article of claim 22, wherein the oxygen scavenging layer is a liner, coating, sealant, gasket, adhesive, non-adhesive insert, or fibrous mat insert in the packaging article.

26. The packaging article of claim 10, wherein the packaging article is in the form of a single layer flexible article, a multilayer flexible article, a singe layer rigid article, or a multilayer rigid article.

27. A method of making an oxygen barrier composition comprising
a blend of an oxygen barrier polymer and an oxygen scavenging polymer,
a photoinitiator, and
an oxidation catalyst,
wherein the blend comprises from 5% to 30% oxygen scavenging polymer, the oxygen barrier polymer is poly(ethylene/vinyl alcohol) (EVOH), and the oxygen scavenging polymer consists essentially of MXD6:
providing the poly(ethylene/vinyl alcohol) (EVOH), the MXD6, and the oxidation catalyst; and
blending the poly(ethylene/vinyl alcohol) (EVOH), the MXD6, and the oxidation catalyst, to form the oxygen barrier composition.

28. The method of claim 27, wherein the blending occurs during a reactive extrusion.

29. A method of forming an oxygen barrier layer in a packaging article comprising:
providing an oxygen barrier composition comprising
a blend of an oxygen barrier polymer and an oxygen scavenging polymer, and a photoinitiator, wherein the blend comprises from 5% to 30% oxygen scavenging polymer, the oxygen barrier polymer is poly(ethylene/vinyl alcohol) (EVOH), and the oxygen scavenging polymer consists essentially of MXD6:

forming the composition into packaging article or an oxygen barrier layer thereof; and forming a transition metal salt into the oxygen barrier layer or a layer adjacent to the oxygen barrier layer of the packaging article.

30. The method of claim 29, wherein the oxygen barrier layer further comprises an antioxidant.

31. The method of claim 29, further comprising forming a structural layer in the packaging article.

32. The method of claim 29, further comprising forming an oxygen scavenging layer in the packaging article.

33. The method of claim 29, further comprising forming the packaging article as a single layer flexible article, a multilayer flexible article, a single layer rigid article, or a multilayer rigid article.

34. The oxygen barrier composition of claim 1, wherein the oxygen barrier polymer consists essentially of poly(ethyene/vinyl alcohol) (EVOH).

35. The oxygen barrier composition of claim 1, wherein the oxygen barrier polymer consists of poly(ethyene/vinyl alcohol) (EVOH) and the oxygen scavenging polymer consists of MXD6.

36. The packaging article of claim 10, wherein the oxygen barrier polymer of the at least one oxygen barrier layer consists essentially of poly(ethylene/vinyl alcohol) (EVOH).

37. The packaging article of claim 10, wherein the oxygen barrier polymer of the at least one oxygen barrier layer consists of poly(ethylene/vinyl alcohol) (EVOH) and the oxygen scavenging polymer of the at least one oxygen barrier layer consists of MXD6.

38. The method of claim 27, wherein the oxygen barrier polymer consists essentially of poly(ethylene/vinyl alcohol) (EVOH).

39. The method of claim 27, wherein the oxygen barrier polymer consists of poly(ethylene/vinyl alcohol) (EVOH) and the oxygen scavenging polymer consists of MXD6.

40. The method of claim 29, wherein the oxygen barrier polymer consists essentially of poly(ethylene/vinyl alcohol) (EVOH).

41. The method of claim 29, wherein the oxygen barrier polymer consists of poly(ethylene/vinyl alcohol) (EVOH) and the oxygen scavenging polymer consists of MXD6.

* * * * *